W. HODGDON.
Milk-Coolers.
No. 138,088.　　　　　　　　　　　Patented April 22, 1873.
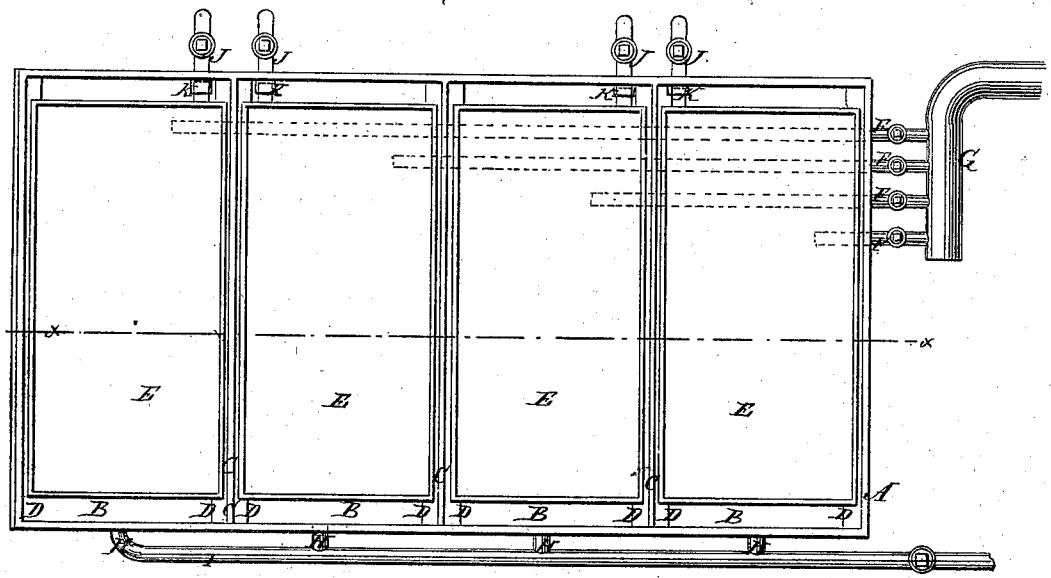
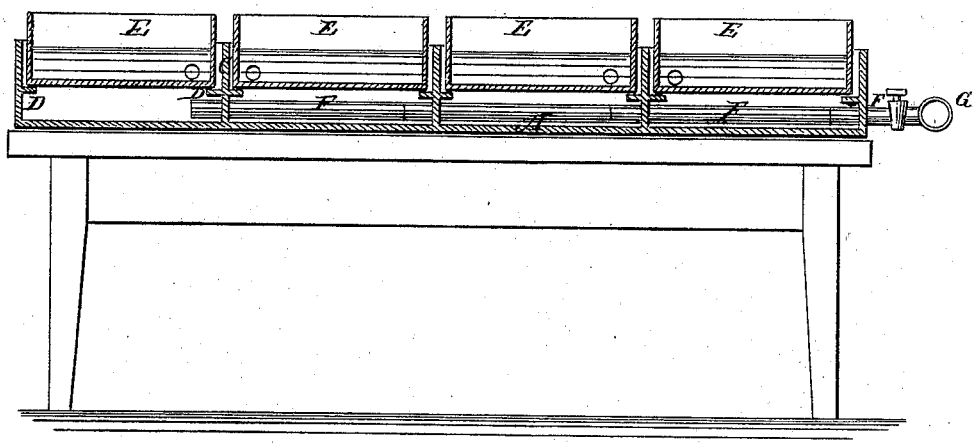
Witnesses:
Inventor:
W. Hodgdon
Per
Attorneys.

UNITED STATES PATENT OFFICE.

WILLIAM HODGDON, OF NORTH CRAFTSBURY, VERMONT.

IMPROVEMENT IN MILK-COOLERS.

Specification forming part of Letters Patent No. 138,088, dated April 22, 1873; application filed March 15, 1873.

*To all whom it may concern:*

Be it known that I, WILLIAM HODGDON, of North Craftsbury, in the county of Orleans and State of Vermont, have invented a new and Improved Milk-Cooler, of which the following is a specification:

My invention consists of a large water-pan divided into four compartments, with a separate water-supply pipe for each and a discharge-pipe connection of each with a main waste-water pipe arranged for filling and regulating the temperature in each independently, with a separate milk-pan for each compartment, each pan having a discharge-pipe for milk, all in a convenient way for treating the milk of each milking independently, so that the treatment can be varied as to the temperature, as required during the time it has to be cooled. The arrangement is also designed to facilitate the removal of the milk-pans readily for painting the bottoms, which has to be done frequently to protect them from corrosion; also for cleansing the large pan.

Fig. 1 is a plan view of my improved cooler. Fig. 2 is a longitudinal sectional elevation taken on the line $x\,x$ of Fig. 1.

Similar letters of reference indicate corresponding parts.

A is a large galvanized-iron pan, which will be arranged, as to size, according to the size of the dairy the milk of which is to be cooled, the requirement being that it shall hold a set of four pans, each of which is large enough to contain the milk of one milking. It is divided into four compartments, B, with partitions C, and has lids D in each compartment to support the pans E a suitable distance above the bottom, and each compartment is provided with its special water-pipe F, connected with the main supply-pipe G or with a reservoir. H is a discharge-pipe connecting each pan with the main discharge I. In practice these discharge-pipes H will have a stop-cock, so that any one of the compartments can be emptied while the others are filled. J represents the discharge-pipe of the milk-pans. These are connected to the side of the pan A, and the sections K inside of the pan A are connected to the milk-pans and arranged so that, when the milk-pans are put in, they can be connected with parts J, water-tight to prevent the water from leaking out of them, or the milk from leaking through the joint in the water-pan. Any suitable arrangement of this joint may be employed, but I prefer to have the connections K, so as to wedge into the ends of the parts J tight.

When the new milk is first put in the pans it requires the coldest water to expel the animal heat, and afterward a higher temperature, which makes it necessary to cool the milk of each milking separately; it is also desirable not to mix the milk, so that each milking can be treated the length of time required; and hence the necessity of a set of pans and apparatus for cooling each separately. It will be seen that the pans can be taken out and put in with very little labor whenever it may be required to do so for painting them or cleaning out the water-pan.

Having thus described my invention, I claim as new and desire to secure by Letters Patent—

The water-pan A with separate bottoms B, a special supply and exhaust pipe for each compartment, pans E, and a special discharge-pipe, J, for each pan, all constructed, combined, and arranged substantially as specified.

WILLIAM HODGDON.

Witnesses:
ISAAC P. WHITNEY,
JESSE B. ROGERS.